United States Patent [19]

Chiklis et al.

[11] 4,397,996
[45] Aug. 9, 1983

[54] PROCESS FOR PREPARING POLYMERIC OXIMES AND COMPOSITIONS CONTAINING SAME

[75] Inventors: Charles K. Chiklis; Alan N. Schuler, both of Lexington, Mass.

[73] Assignee: Polaroid Corporation, Cambridge, Mass.

[21] Appl. No.: 266,364

[22] Filed: May 22, 1981

[51] Int. Cl.³ .............................................. C08F 8/32
[52] U.S. Cl. .................................. 525/380; 430/212; 430/466; 525/328.2
[58] Field of Search ................ 525/380, 336; 526/304; 430/215, 218, 436, 505, 545, 559, 497

[56] References Cited

U.S. PATENT DOCUMENTS 4,202,694 5/1980 Taylor ................................. 430/215

FOREIGN PATENT DOCUMENTS 622821 8/1978 U.S.S.R. .............................. 525/380

OTHER PUBLICATIONS

Photopolymerization Initiated by Oxime Derivatives by Sung et al., vol. 12, 2553-2566, (1974), J. Pol. Sc.

Primary Examiner—Paul R. Michl
Attorney, Agent, or Firm—Louis G. Xiarhos

[57] ABSTRACT

A process for preparing polymeric oximes and photographic processing compositions containing polymeric oximes are described. The polymeric oximes are prepared by a process which comprises: introducing into an aqueous polymerization medium a portion of a polymerizable monomer to be polymerized, said polymerizable monomer having the formula

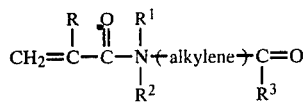

wherein R is hydrogen or methyl, $R^1$ is hydrogen, alkyl of from 1 to 4 carbon atoms, benzyl or phenyl, $R^2$ is alkyl of from 1 to 4 carbon atoms, benzyl or phenyl, alkylene is a divalent alkylene radical having 1 or 2 carbon atoms, and $R^3$ is hydrogen, alkyl of from 1 to 4 carbon atoms or phenyl; initiating the emulsion polymerization of said monomer, and while maintaining said polymerization, introducing substantially uniformly over the course of the polymerization, the remaining polymerizable monomer to be polymerized, thereby to provide a polymeric latex of polymeric particles of said polymerizable monomer in a water medium; contacting said polymeric latex with an organic solvent for said latex particles in an amount sufficient to effect swelling of the polymeric particles in said medium; and oximating the swollen polymeric particles by reaction with hydroxylamine salt and an amount of alkalinity sufficient to provide free hydroxylamine for said oximation but insufficient to effect alkali solubilization of the resulting oximated polymeric particles.

23 Claims, No Drawings

PROCESS FOR PREPARING POLYMERIC OXIMES AND COMPOSITIONS CONTAINING SAME

BACKGROUND OF THE INVENTION

This invention relates to a process for preparing a polymeric oxime and to the polymeric oxime of such process. More particularly, it relates to a process for preparing a polymeric oxime especially adapted to utilization in photographic processing compositions.

Polymeric oximes and their preparation and utilization as viscosity-increasing reagents in photographic processing compositions have been described in U.S. Pat. No. 4,202,694 (issued May 13, 1980 to L. D. Taylor). In the conduct of, for example, photographic diffusion transfer processes, it has been conventional practice to effect development with the aid of a processing composition which includes a viscosity increasing reagent to facilitate uniform application of the processing composition to an exposed film unit. In the aforesaid patent, polymeric materials having pendant oxime groups, and inclusive of such materials as poly(diacetone acrylamide oxime), are described as especially adapted to utilization as viscosity-increasing agents in photographic processing compositions. While the polymeric oximes of the aforesaid patent provide advantageous properties in photographic processing compositions, particular and useful properties thereof may in part be determined by the particular process utilized for the production of the polymeric oxime.

In the processing of a diffusion transfer film unit where a processing composition is typically spread from a rupturable container by passage of the film unit between a pair of rollers so as to distribute the processing composition between sheet elements of the film unit, it is desirable that the coverage or amount of processing composition spread between the elements be substantially uniform over a range of processing temperatures. Inasmuch as appreciable variation in processing composition coverage can affect development, opacification and other photographic functions, it is especially advantageous that a photographic processing composition be susceptible of use in diffusion transfer processing while providing considerable processing temperature latitude, i.e., that the processing composition be capable of being spread with substantial uniformity over a wide range of processing temperatures.

SUMMARY OF THE INVENTION

It has been found that a polymeric oxime adapted to utilization in a photographic processing composition, and, especially advantageous from the standpoint of the provision of a photographic processing composition capable of uniform spreading over a wide range of processing temperatures, can be provided by the process of the present invention. In its process aspect, the present invention thus provides a process for preparing a polymeric oxime which comprises the steps of introducing into an aqueous polymerization medium a portion of a polymerizable monomer to be polymerized, said polymerizable monomer having the formula

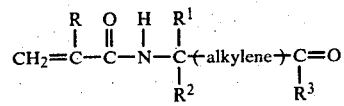

wherein R is hydrogen or methyl, $R^1$ is hydrogen, alkyl of from 1 to 4 carbon atoms, benzyl or phenyl, $R^2$ is alkyl of from 1 to 4 carbon atoms, benzyl or phenyl, alkylene is a divalent alkylene radical having 1 or 2 carbon atoms, and $R^3$ is hydrogen, alkyl of from 1 to 4 carbon atoms or phenyl; initiating the emulsion polymerization of said monomer, and while maintaining said polymerization, introducing substantially uniformly over the course of the polymerization, the remaining polymerizable monomer to be polymerized, thereby to provide a polymeric latex of polymeric particles of said polymerizable monomer in a water medium; contacting said polymeric latex with an organic solvent for said latex particles in an amount sufficient to effect swelling of the polymeric particles in said medium; and oximating the swollen polymeric particles by reaction with hydroxylamine salt and an amount of alkalinity sufficient to provide free hydroxylamine for said oximation but insufficient to effect alkali solubilization of the resulting oximated polymeric particles.

In one of its product aspects, the present invention provides a polymeric oxime prepared by the process as aforedescribed. In another product aspect, the present invention provides a photographic processing composition comprising an aqueous alkaline medium and, as a viscosity-increasing agent, a polymeric oxime of the invention.

The advantages of the present invention as well as details relating to the practice of the invention will be better appreciated from the following detailed description.

DETAILED DESCRIPTION OF THE INVENTION

The polymeric oxime of the present invention is provided by a process whereby a polymerizable monomeric ketone or aldehyde is formed into a latex by emulsion polymerization technique and thereafter oximated by reaction with hydroxylamine. The conduct of such a process, whereby there are realized processing advantages and the provision of a polymeric oxime having advantageous photographic product applications, is described hereinafter by reference to the particular steps and conditions of the process importantly related to the realization of such product and process advantages.

The emulsion polymerization reaction of the process of the invention is conducted by resort to a semi-continuous emulsion polymerization technique. This is effected by introducing into an aqueous polymerization medium a portion of a polymerizable monomer to be polymerized, the monomer having the formula

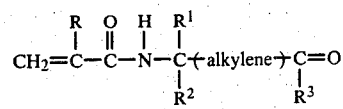

(wherein each of R, $R^1$, $R^2$, $R^3$ and alkylene has the meaning set forth hereinbefore) and conducting the emulsion polymerization by a process whereby additional polymerizable monomer is added over the course of the polymerization reaction and formation of the resulting latex. In general, this method of forming the latex of the polymerizable monomer permits desired maintenance of uniformity or homogeneity in the reaction system and the resulting latex. In addition, the conduct of the polymerization in this manner allows the reaction system to be readily agitated such that desired temperature control and scale-up operations can be realized while avoiding localized high-temperature gradients in the reaction system.

An important step in the semi-continuous emulsion polymerization technique utilized for production of the latex involves introducing into a suitable aqueous polymerization medium only a portion of the monomer or mixture of monomers to be polymerized. In general, any predetermined and minor portion of the monomer or monomers to be polymerized can be utilized to commence the emulsion polymerization while reserving the balance of such monomer or monomers for addition during the course of the polymerization. The amount of monomer initially added to the aqueous polymerization medium can range from about 1% to about 15% by weight of the monomer to be polymerized. Preferably, from about 5% to about 10% of the polymerizable monomer will be utilized as a first predetermined portion. This amount has been found to provide desired results from the standpoints of uniformity or homogeneity in the polymerization system and the resulting polymeric latex.

Upon initiation of the emulsion polymerization reaction, the balance of the monomer to be polymerized will be added to the reaction system substantially uniformly over the course of the polymerization so as to effect completion of latex formation. Usually, the remaining portion of the polymerizable monomer to be polymerized will be added to the initiated polymerization system by introducing a substantially uniform or steady feed of the remaining monomer into the polymerization system. For example, the remaining portion of polymerizable monomer can be added to the polymerization system over a period of six or more hours for completion of desired polymerization. Preferably, upon initiation of the polymerization, the remaining portion of polymerizable monomer will be introduced into the polymerization system gradually over a period of about 2 to 4 hours. If desired, incremental portions can be added over the course of the polymerization provided that the amounts of such incremental portions are added substantially uniformly over the course of the polymerization so as not to negate formation of a uniform or homogeneous latex. Good results are obtained in the case of the production of a poly(diacetone acrylamide)-latex by introducing into an aqueous polymerization medium, for example, about 8% to 10% by weight of the monomeric diacetone acrylamide to be polymerized, initiating the polymerization and adding to the initiated reaction system, via uniform feed over a period of about 3 hours, the remaining polymerizable monomer.

The polymerizable monomer utilized for the production of the latex in the manner described comprises a monomer or mixture of monomers having the formula

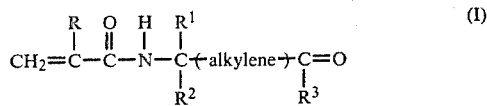

wherein R is hydrogen or methyl; $R^1$ is hydrogen, alkyl of from 1 to 4 carbon atoms, benzyl or phenyl; $R^2$ is alkyl of from 1 to 4 carbon atoms, benzyl or phenyl; alkylene represents a divalent alkylene radical of 1 or 2 carbon atoms, and $R^3$ is hydrogen, alkyl of from 1 to 4 carbon atoms or phenyl. From inspection of Formula (I), it will be seen the polymerizable monomers utilized in the production of the latex include acrylamides (R is hydrogen) and methacrylamides (R is methyl) and include ketones ($R^3$ is alkyl or phenyl) and aldehydes ($R^3$ is hydrogen). Preferably, R will be hydrogen. It will be appreciated from the nature of $R^1$ and $R^2$ that the polymerizable monomer is a hindered amide and that only one of $R^1$ and $R^2$ can be hydrogen. Preferably, each of $R^1$ and $R^2$ will be alkyl of 1 to 4 carbon atoms. The "alkylene" moiety can have one or two carbon atoms, and preferably, one carbon atom, i.e., methylene. In general, the nature of R, $R^1$, $R^2$, alkylene and $R^3$ should be such that the polymerizable monomer exhibits sufficient water solubility such that an aqueous emulsion polymerization can be conducted.

A preferred class of monomers for production of the latex includes monomers having the formula

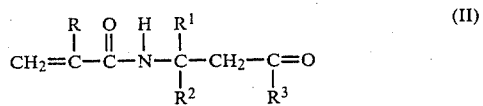

wherein R is hydrogen or methyl, preferably hydrogen; each of $R^1$ and $R^2$ is alkyl of from 1 to 4 carbon atoms, preferably methyl or ethyl; and $R^3$ is hydrogen or alkyl of 1 to 4 carbon atoms, preferably methyl.

As examples of polymerizable monomers of Formula (I), mention may be made of the following

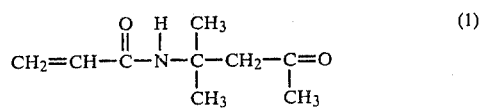

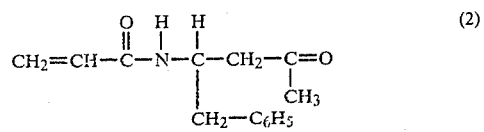

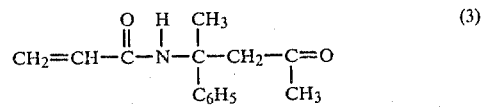

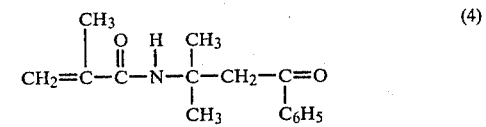

A preferred monomer for production of the latex hereof is diacetone acrylamide (DAA) having the formula (1) hereinbefore. Diacetone acrylamide can be readily polymerized to a uniform latex and has been found to provide an oximated polymer especially suited to application as a viscosity-increasing agent in a photographic processing composition.

The latex prepared by emulsion polymerization of a polymerizable monomer of Formula (I) can comprise a homopolymer, a copolymer comprising recurring units from two or more such polymerizable monomers of Formula (I) or a copolymer comprising recurring units from a monomer or monomers of Formula (I) and recurring units from another copolymerizable monomer. For example, the latex can comprise a polymer including recurring units from a monomer of Formula (I) and recurring units from a copolymerizable monomer such as acrylic acid, methacrylic acid, 2-acrylamido-2-methylpropanesulfonic acid or the like. Preferably, a copolymerizable monomer, where employed, will be an ionizable monomer such as acrylic acid, methacrylic acid or 2-acrylamido-2-methylpropanesulfonic acid to provide latex stability and/or hydrophilicity. A preferred comonomer is acrylic acid which can be utilized in the production of the latex in a minor amount, typically about 1 to 10% by weight of the polymer, to assist in the production of latex particles having improved stability against settling or phase separation. In addition, utilization of acrylic acid comonomer allows for the production of an oximated polymer having improved wettability in the production of an aqueous alkaline processing composition.

In carrying out the process of the present invention, emulsion polymerization is initiated using any of a variety of polymerization initiators including oxidizing agents such as ammonium persulfate, potassium persulfate, sodium persulfate, and peroxides such as hydrogen peroxide. An azo-type initiator can be employed if desired. Redox polymerization initiators comprising a combination of oxidizing agent and reducing agent can also be employed. Suitable oxidizing agents for such combinations include tert-butylhydroperoxide and those mentioned hereinbefore while suitable reducing agents include ascorbic acid and the various sulfites and bisulfites such as sodium bisulfite. Good results from the standpoint of production of a uniform or homogeneous latex have been obtained utilizing ammonium persulfate as a polymerization initiator, although others as mentioned can also be suitably employed.

Polymerization initiation can be effected by introducing the initiator into a suitable polymerization vessel containing the aqueous polymerization medium and a portion of the monomer to be polymerized. If desired, separate feed streams of monomer and polymerization initiator can be introduced simultaneously into the polymerization vessel. It will thus be appreciated that the steps of introducing a portion of the monomer into the polymerization medium and initiating polymerization can occur virtually simultaneously. Upon initiation of polymerization, the remaining portion of polymerizable monomer (or monomers) can be introduced in the manner described hereinbefore. The amount of polymerization initiator employed will generally be less than about 5%, based upon the weight of polymerizable monomer. The amount can depend, for example, on the efficiency of the polymerization initiator, the stability of the agent under the conditions of polymerization, the particular monomers utilized and the desired molecular weight of the polymer of the resulting latex. In general, the minimum weight of initiator sufficient to sustain the polymerization reaction (usually less than 1% by weight based on the weight of monomer to be polymerized) will be utilized, such minimum amount of initiator tending to promote formation of higher molecular weight polymers.

The latex polymerization is effected with the aid of a suitable emulsifying agent for emulsification in the aqueous reaction medium of the polymeric latex particles. Any of a variety of emulsifiers can be suitably employed inclusive of the alkylphenol ethoxylates, sulfosuccinates and the like. A preferred emulsifier is bistridecyl sodium sulfosuccinate. Stabilizing and other agents can be included in the production of the latex. For example, hydroxyethyl cellulose can be employed during the latex polymerization as a stabilizer for the latex.

The emulsion polymerization reaction provides a homogeneous and stirrable latex of polymeric particles having an average particle size of about 0.1 micron to 0.8 micron. While applicants do not wish to be bound by precise theory or mechanism in explanation of the advantageous properties of the polymeric oximes of the invention in photographic processing compositions, the method described hereinbefore for the production of the polymeric latex, whereby a uniform or homogeneous latex is provided, is believed importantly related to the capacity of such particles to be swollen and aggregated or agglomerated to larger particles which can be then oximated with production of a polymeric oxime of characteristic uniformity or homogeneity.

The swelling of the latex particles is effected by contacting the latex with an organic solvent for the latex particles. A variety of organic solvents can be utilized for this purpose. Preferred solvents include the lower alkanols, e.g., methanol, ethanol, isopropanol and the like, which provide sufficient solvent action to effectively swell the latex particles. Other solvents that can suitably be employed include ethers such as tetrohydrofuran and dioxane. It will be appreciated that the organic solvent utilized for the swelling of the latex particles should be stable and substantially non-reactive so as to not react with the polymer, the oximating reagents or otherwise interfere with the conduct of the process. Preferably, the organic solvent will be miscible with the aqueous phase so as to avoid the formation of a separate organic polymer-containing phase.

Contact of the polymeric latex and the organic solvent can be suitably accomplished by adding the solvent to the polymeric latex with stirring. If desired, the polymeric latex can be introduced into a stirring zone containing the particular solvent to be utilized for the swelling operation. Contact between the polymeric latex and organic solvent should be effected gradually so as to effect a controlled swelling operation. It has been found that a too-rapid addition, for example, of organic solvent to polymeric latex promotes the formation of large particles. Such particles tend to hamper efficient oximation and promote formation of a difficultly manageable slurry. Good results can be realized by a uniform addition of solvent to polymeric latex over a period from about 0. 5 to 2 hours.

The amount of solvent utilized in the latex swelling step can vary with the particular nature of the polymeric latex particles, the molecular weight of the polymer and the nature of the solvent. The amount employed should, however, be sufficient to swell the latex particles but insufficient to cause appreciable dissolution of the particles. Appreciable dissolution of the particles promotes the formation of large particles which present difficulties in the recovery of a uniform slurry and which may require size reduction. In general, the conduct of a size-reduction step provides an oximated product exhibiting a lower level of product performance such that the utilization of too great an amount of solvent and formation of such large particles are to be avoided. In the case of a preferred embodiment whereby a latex of poly(diacetone acrylamide) is contacted with an organic solvent for swelling of the particles, an amount of methanol of from about 60% to about 150% by weight of the latex has been found to provide satisfactory results. Other suitable amounts can be determined for other polymeric latices and solvents as appropriate.

In the conduct of the latex swelling step, destabilization of the latex and aggregation or agglomeration of the latex particles occurs such that the latex is broken and a slurry comprising much larger and swollen particle aggregates is obtained. The slurry of swollen particles can be readily agitated such that a heterogeneous oximation under desired and controlled conditions can be effected by reaction with hydroxylamine.

The oximation step of the present process is conducted by reaction of the swollen polymeric particles with hydroxylamine such that the corresponding polymeric oxime is provided. The oximation reaction can be illustrated by reference to the following reaction scheme whereby poly(diacetone acrylamide) is converted to poly(diacetone acrylamide oxime):

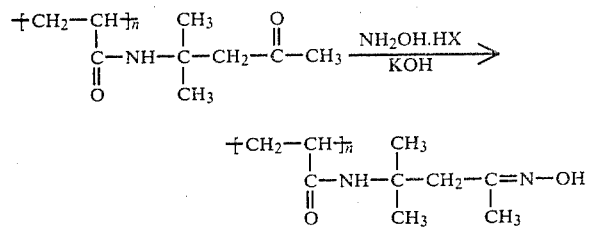

The oximation reaction is readily conducted by reaction of the swollen particles with hydroxylamine salt, e.g., hydrochloride or hydrosulfate in the presence of a source of alkalinity. Potassium hydroxide, sodium hydroxide or like basic material can be utilized to provide free hydroxylamine for reaction with the carbonyl groups of the polymeric particles. In general, good results are obtained when the amount of hydroxylamine reagent utilized corresponds to the stoichiometric amount required to react with the carbonyl groups of the polymeric particles. A stoichiometric excess, for example, about 15% in excess can be employed if desired to assure complete oximation. It will be appreciated, however, that the oximation can be conducted such that only a portion of the carbonyl groups available for oximation are converted to oxime groups. Thus, partially oximated polymers can be suitably formed and degree of oximation may conveniently be utilized as a means of controlling the solubility of the polymeric oxime or the capacity of the polymer to be readily dispersed in a particular medium, e.g., in an aqueous alkaline photographic processing composition.

Oximation of the swollen polymeric particles can be conveniently accomplished by introducing separate streams of aqueous hydroxylamine salt and aqueous alkali into the slurry with suitable agitation such that free hydroxylamine is generated in situ for reaction with available carbonyl groups. The amount of alkali utilized should be at least the stoichiometric amount to provide desired free hydroxylamine but should be insufficient to effect appreciable dissolution of oximated particles. Such an amount, thus, permits conduct of the desired oximation reaction while maintaining the condition of swollen polymeric oxime particles dispersed throughout the aqueous continuum. In general, an amount of alkali, e.g., potassium hydroxide, of up to about 20% in excess of that stoichiometrically required to provide free hydroxylamine from the hydroxylamine salt can be employed with good results from the standpoint of the provision of a desired uniform dispersion of swollen polymeric oxime particles. The oximation reaction is generally conducted within a temperature range of from about 25° C. to about 60° C. and over a period of from about 3 to 10 hours. Suitable oximation reaction temperatures and times can vary depending upon the nature of the particular polymer to be oximated and the solvent employed and the amounts of hydroxylamine salt and alkaline material employed.

The oximated product as aforedescribed is treated with acid for neutralization of excess alkalinity and recovery of the separated polymeric oxime. Any suitable acid, such as acetic acid or a mineral acid, e.g., sulfuric or hydrochloric acid, can be employed for this purpose with separation of the desired polymer. The polymer can be recovered by filtration and can be washed with water to remove salts or other impurities. The product can be recovered as a wet cake of finely divided polymeric oxime. Addition of such material to water, followed by gradual addition of alkali with good agitation provides a pseudosolution or microsol comprised of highly swollen polymeric oxime particles in a dispersed state. The polymeric product or a dispersion thereof in alkali can be utilized in the production of an aqueous alkaline photographic processing composition having certain advantageous properties as described hereinafter.

The conduct of the process of the present invention affords certain advantages. For example, if desired, the process can be conducted as a "one-pot" process whereby latex formation and subsequent swelling and oximation steps are conducted in the same reaction vessel. The process, and particularly the latex forming step can be readily scaled to greater production without associated problems of "hot-spots" or temperature gradients. Importantly, uniformity of the recovered polymeric oxime in a state of fine subdivision permits utilization in the production of aqueous alkaline processing compositions without need for grinding or other size reduction steps. It will be appreciated that aqueous alkaline photographic compositions intended for diffusion transfer processing typically contain various photographic agents. The utilization of the polymeric oxime of the present invention permits a reduction in the number of required filter changes, thus, effecting a cost savings by reduction of losses of such photographic agents accompanying such filter changes.

Polymeric oximes prepared by the present process can be effectively utilized as viscosity-increasing agents in photographic processing compositions. The processing compositions employed in diffusion transfer processes of the type contemplated herein typically are aqueous alkaline compositions having a pH in excess of about 12, and frequently in the order of 14 or greater. These compositions comprise an aqueous alkaline medium comprising sodium hydroxide, potassium hydroxide or other alkaline material or materials suited to the provision of a pH within the range of about 12 to 14 or higher. The compositions can additionally include known silver halide developing agents, opacification dyes and other photographic agents typically included in such compositions. Preferably, the processing composition will additionally include a pigment material such as carbon black or titanium dioxide. The polymeric oximes of the invention are especially useful in processing compositions containing a pigment inasmuch as desirable dispersion of the pigment material and resulting stability is provided.

The polymeric oxime can be conveniently incorporated into a processing composition by introducing powered polymeric oxime, with agitation, to a charge of water and pigment. Aqueous alkali can then be slowly added with agitation followed by addition of photographic agents, blending and filtering. Alternatively, a premix of aqueous alkaline composition containing the polymeric oxime can be charged to a dispersion of pigment and additional photographic agents can be added and the resulting composition filtered for production of a photographic processing composition.

The following Examples illustrate the preparation of oxime polymers of the invention and photographic processing compositions containing same. These Examples are merely illustrative and not intended to be limitative.

EXAMPLE 1

In a three-necked, 12-liter flask equipped with a stirrer, condenser, thermometer, nitrogen inlet, monomer-feed dropping funnel and heating bath, 2.67 grams of hydroxyethyl cellulose (HEC-250L, Hercules Incorporated) were dispersed with agitation in 2000 cc. of water. After dispersion of the hydroxyethyl cellulose, the contents of the flask were heated to 55° C. under a nitrogen purge until the hydroxyethyl cellulose had dissolved. Into a separate flask containing 600 cc. of water, were added 442 grams (2.615 moles) of diacetone acrylamide, 8 grams (0.111 mole) of acrylic acid and 2.7 grams of bis-tridecyl sodium sulfosuccinate (as 3.8 grams of Aerosol TR-70 emulsifier from American Cyanamid Corporation). The resulting solution was passed through a 25-micron filter and was charged into the dropping funnel. An aliquot of 100 mls. of the resulting solution (approximately ten percent by volume of the solution) was charged to the reaction vessel when the internal temperature had stabilized at 55° C. and the vessel was purged for 15 minutes with nitrogen and continuous stirring. A solution of 0.24 gram of ammonium persulfate, $(NH_4)_2S_2O_8$, in three cc. of water was charged to the reaction flask. Within five minutes, a bluish emulsion was formed. Ten minutes after the addition of the ammonium persulfate solution, the remaining quantity of monomer solution was fed from the dropping funnel over a three-hour period. Upon completion of the monomer solution addition, the reaction system was maintained for one hour at 55° C. to complete monomer conversion (to a residual monomer level <0.1 wt.%). The reaction mixture, a polymeric latex of poly(diacetone acrylamide-co-acrylic acid) was cooled to 40° C. for conduct of subsequent swelling and oximation steps.

The polymeric latex, prepared as described, was subjected to a swelling operation whereby 3050 cc. of methanol were slowly added with stirring to the latex over a 30-minute period. This was followed by charging 208.7 grams of hydroxylamine hydrochloride (3.0 moles) to the reaction flask, followed by the addition over a ten-minute period of 443.7 grams of an aqueous potassium hydroxide solution (45% by weight concentration). The oximation reaction was allowed to proceed for three hours at 40° C. at which time, 78.4 grams of concentrated sulfuric acid (in approximately 1.5 liter of water) were added to the reaction vessel to render the pH to about 3.5 to 4. The resulting oximated polymeric product was suction filtered for recovery of a filter cake of polymeric product which was then washed with water for removal of salts and air dried to a product of about 20 to 35% solids by weight. The product, a polymer in a fine state of subdivision, was suitable for utilization in the production of a photographic processing composition.

EXAMPLE 2

Utilizing the procedure, ingredients and amounts thereof set forth in EXAMPLE 1, a polymeric latex of poly(diacetone acrylamide-co-acrylic acid) was prepared. The swelling and oximation steps were conducted in the following manner.

The polymeric latex was added over a 30-minute period with stirring to a reaction flask containing 3050 cc. of methanol at a temperature of 40° C. Hydroxylamine hydrochloride (208.7 grams) was added to the reaction vessel followed by addition over a ten-minute period of 443.7 grams of 45% potassium hydroxide. The oximation reaction was conducted for three hours. The reaction mixture was rendered acidic by adding 1.5 liters of water containing 78.4 grams of concentrated sulfuric acid. The reaction contents were filtered and the resulting polymeric filter cake was thoroughly washed with water and air dried to 30 to 35% solids. The product was suited to use in the preparation of a photographic processing composition.

EXAMPLE 3

The procedure set forth in EXAMPLE 1 was repeated except that, in lieu of eight grams of acrylic acid, there were utilized 9.5 grams of methacrylic acid. The resulting polymeric product was, accordingly, the oxime of poly(diacetone acrylamide-co-methacrylic acid). The product, washed and dried as described in EXAMPLE 1, was suited without further preparation to utilization in the preparation of a photographic processing composition.

EXAMPLE 4

The procedure set forth in EXAMPLE 1 was repeated except that, no acrylic acid was utilized in the manufacture of the polymeric latex and an additional eight grams of diacetone acrylamide (corresponding to the eight grams of acrylic acid in EXAMPLE 1) were utilized. The resulting polymeric oxime was, accordingly, the oxime of the homopolymer, poly(diacetone acrylamide). The product washed and dried as described in EXAMPLE 1 was suited without further preparation to utilization in the preparation of a photographic processing composition.

EXAMPLE 5

The procedure set forth in EXAMPLE 1 was repeated except that the 2.67 grams of hydroxyethyl cellulose were not utilized. The product, washed and dried as described in EXAMPLE 1, was suited without further preparation to utilization in the preparation of a photographic processing composition.

EXAMPLE 6

Alkaline photographic processing compositions containing polymeric oximes of the present invention were prepared. In the photographic processing compositions, identified hereinafter as Photographic Processing Compositions 6-A through 6-E, the following ingredients in the amounts stated were employed. The polymeric oximes utilized in Photographic Processing Compositions 6-A through 6-E were the products, respectively, of EXAMPLES 1 through 5 hereof.

| Ingredients | Amounts |
| --- | --- |
| Water | 100 grams |
| Titanium Dioxide | 118 grams |
| Polymeric oxime | 1.64 grams |
| Potassium hydroxide | 10.75 grams |
| Benzotriazole | 0.24 gram |
| 4-amino-pyrazole(3,4d)pyrimidine | 0.51 gram |
| 6-methyl uracil | 0.61 gram |
| Hydroxyethyl tricarboxymethyl ethylene diamine | 1.54 grams |
| Poly(ethylene glycol), Mol. Wt. 4000 | 0.93 gram |
| N—phenethyl-α-picolinium bromide | 2.62 grams |
| 2-methyl imidazole | 1.22 grams |
| Allopurinol | 0.17 gram |
| 3,5-dimethylazabenzimidazole | 0.24 gram |
| 1-(4-hydroxyphenyl)tetrazoline 5-thione | 0.98 gram |
| Opacification dye (Formula OD-1) | 3.20 grams |
| Opacification dye (Formula OD-2) | 0.61 gram |
| Colloidal silica aqueous dispersion (30% SiO$_2$) | 1.88 gram |

The opacification dyes utilized in Photographic Processing Compositions 6-A through 6-E were the following:

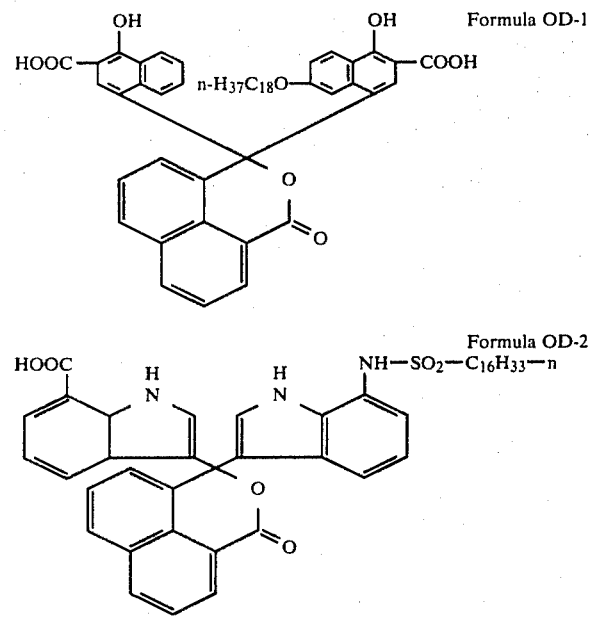

Photographic Processing Compositions 6-A through 6-E were contained in rupturable containers (hereinafter pods) comprised of polyvinyl chloride-lined lead foil. The pods were utilized for evaluation of the respective processing compositions as described in greater detail hereinafter.

COMPARATIVE EXAMPLE 7

For purposes of comparison with the properties of Photographic Processing Compositions 6-A through 6-E, processing compositions identified hereinafter as Processing Compositions 7-A and 7-B were prepared. Each of the processing compositions had the same composition as recited for Processing Compositions 6-A through 6-E, except for the polymeric oxime. In the case of Processing Composition 7-A, 1.64 grams of poly(diacetone acrylamide)oxime, prepared in accordance with the procedure set forth in EXAMPLE 1 of U.S. Pat. No. 4,202,694, was utilized. In the case of Processing Composition 7-B, there was utilized 1.64 grams of the oxime of poly(diacetone acrylamide-co-acrylic acid), prepared in accordance with the procedure set forth in EXAMPLE 3 of the aforementioned U.S. Pat. No. 4,202,694. The photographic processing compositions were contained in rupturable pods as described in EXAMPLE 6 for use in the evaluation thereof.

EXAMPLE 8

Photographic film units were prepared, each film unit comprising negative and image-receiving elements in a face-to-face relationship (i.e., their respective supports outermost) and having a rupturable pod fixedly mounted therebetween at the leading edge of each film unit such that passage of the film unit between a pair of rollers would rupture the marginal seal of the pod and distribute the processing composition uniformly between the negative and image-receiving elements. Film units utilizing rupturable pods containing each of Photographic Processing Compositions 6-A through 6-E and 7-A and 7-B were prepared. Each film unit was provided with a trap means at the trailing edge so as to trap excess processing composition. Each film unit was provided with a binding element along the lateral edges of the film unit and the leading and trailing edges so as to generally define a frame and a rectangular area corresponding to the area in which the photographic image is produced. The structure of such film units is known and is generally described, for example, in U.S. Pat. No. 3,761,288 (issued Sept. 25, 1973 to E. H. Land et al.). Film packs comprising a stacked array of ten of each of such film units were assembled and utilized fo the conduct of the following evaluation.

Film units utilizing rupturable pods containing each of the aforedescribed photographic processing compositions were employed for the determination in each case of the utilized weight (UTW) of photographic processing composition, i.e., the amount of photographic processing composition spread over the image area of each film unit at a stated temperature. The determination of utilized weight (UTW) at different temperatures permits a measure of the differences in amount of photographic processing composition spread within the image area as the result of spreading of a processng composition at different temperatures.

Utilized weight was determined for each processing composition for each of three temperatures (45° F., 75° F. and 95° F.). Film packs, each containing ten film units were equilibrated to each test temperature for at least two hours. A camera equipped with processing rolls was utilized to effect processing of all film units, i.e., spreading of each processing composition at each temperature, and was equilibrated to each test temperature for at least 30 minutes. The sequence in which film units were utilized for conduct of the evaluation was random so as to avoid systematic errors. One film unit was removed from each film pack, and without processing of the film unit, the leading and trailing ends of the film unit were cut from the film unit to recover the pod and trap elements of the film unit. The weight of the trap (A) and the weight of the pod (B) were recorded. Then the pod was carefully opened, thoroughly cleaned out and reweighed (C).

A second film unit was then processed by passing the unit through the rollers of the camera, i.e., by ejecting the film unit from the camera. Again, the trap and pod ends were removed, quickly weighed and their weights (D and E, respectively) recorded. Once more, the pod was carefully opened, cleaned and reweighed (F). This procedure was repeated until five processed and five unprocessed film units were tested. Recorded data consisted of:

1. Five trap weights from unprocessed film units (A1 to A5);
2. Five pod weights from unprocessed film units (B1 to B5);
3. Five weights of cleaned-out pods from unprocessed film units (C1 to C5);
4. Five trap weights from processed film units (D1 to D5);
5. Five pod weights from processed film units (E1 to E5); and
6. Five pod weights of cleaned-out pods from processed film units (F1 to F5).

Average pod fill weight, $\overline{Z}$, was calculated as follows:

$$\overline{Z} = \left[ \sum_{i=1}^{5} (B_i - C_i) \right] / 5$$

The average weight of processing composition in each trap was calculated as follows:

$$\overline{Y} = \left[ \sum_{i=1}^{5} (D_i - A_i) \right] / 5$$

The average weight of residual processing composition in each pod was calculated as follows:

$$\overline{X} = \left[ \sum_{i=1}^{5} (E_i - F_i) \right] / 5$$

Utilized weight (UTW) is defined by the following relationship:

$$UTW = \overline{Z} - (\overline{X} + \overline{Y})$$

It will be appreciated that utilized weight is a measure of the processing composition spread in the image area of each film unit, i.e., the amount of processing composition filled into a pod less the amount remaining in the pod and the amount present in the trap.

Processing temperature latitude (PTL) was determined by conducting the preceding test at each of the three test temperatures and determining utilized weights at each of the temperatures for each of the processing compositions. Processing temperature latitude was calculated from utilized weights by resort to the formulas:

$$PTL = (UTW_{75°} - UTW_{95°}) + (UTW_{45°} - UTW_{75°})$$

$$PTL = UTW_{45°} - UTW_{95°}.$$

It will be seen from inspection of the above relationships that PTL represents the difference in utilized weight occurring as a result of spreading the processing composition at 45° F. and 95° F. Smaller PTL values are more desirable, indicative of less temperature variation on spreading. The following results reported in TABLE I were obtained.

TABLE I

| Photographic Processing Composition | Polymeric Oxime | PTL (in mgs) |
|---|---|---|
| 6-A | EXAMPLE 1 | 53 |
| 6-B | EXAMPLE 2 | 74 |
| 6-C | EXAMPLE 3 | 70 |
| 6-D | EXAMPLE 4 | 46 |
| 6-E | EXAMPLE 5 | 54 |
| 7-A | EXAMPLE 1 (U.S. Pat. No. 4,202,694) | 100 |
| 7-B | EXAMPLE 3 (U.S. Pat. No. 4,202,694) | 126 |

It will be seen from inspection of the preceding data that the utilization of polymeric oximes and Photographic Processing Compositions of the invention (6-A through 6-E) showed less change in utilized weight, i.e., greater uniformity in utilized weight, over the range of test temperatures than the utilization of the Photographic Processing Compositions 7-A and 7-B (containing polymeric oximes prepared as described in U.S. Pat. No. 4,202,694).

It will be appreciated that variability in the amount of processing composition spread between photographic elements as a result of temperature variations can adversely affect photographic performance. Thus, while an amount of processing composition may be supplied to a rupturable container for optimal coverage at a predetermined target processing temperature, e.g., 75° F., processing at temperatures lower or higher than the target temperature can result in different coverages with variable photographic results. For example, processing at an elevated temperature can result in lower coverage of processing composition with a resulting reduction in the amount of opacification dye or other agents available for performance of their respective functions. The utilization of the polymeric oximes hereof are, thus, especially advantageous in permitting substantial reductions in the amount of coverage variability observed as a result of processing temperature differences.

What is claimed is:

1. A process for preparing a polymeric oxime which comprises the steps of introducing into an aqueous polymerization medium a portion of a polymerizable monomer to be polymerized, said polymerizable monomer having the formula

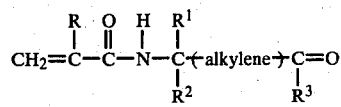

wherein R is hydrogen or methyl, $R^1$ is hydrogen, alkyl of from 1 to 4 carbon atoms, benzyl or phenyl, $R^2$ is alkyl of from 1 to 4 carbon atoms, benzyl or phenyl, alkylene is a divalent alkylene radical having 1 to 2 carbon atoms, and $R^3$ is hydrogen, alkyl of from 1 to 4 carbon atoms or phenyl; initiating the emulsion polymerization of said monomer, and while maintaining said polymerization, introducing substantially uniformly over the course of the polymerization, the remaining polymerizable monomer to be polymerized, thereby to provide a polymeric latex of polymeric particles of said polymerizable monomer in a water medium; contacting said polymeric latex with an organic solvent for said latex particles in an amount sufficient to effect swelling of the polymeric particles in said medium; and oximating the swollen polymeric particles by reaction with hydroxylamine salt and an amount of alkalinity sufficient to provide free hydroxylamine for said oximation but insufficient to effect appreciable alkali solubilization of the resulting oximated polymeric particles.

2. The process of claim 1 wherein said portion of polymerizable monomer introduced into said aqueous polymerization medium comprises from about 1% to about 15% by weight of the polymerizable monomer to be polymerized.

3. The process of claim 2 wherein said remaining polymerizable monomer introduced substantially uniformly over the course of said polymerization is introduced over a period of up to about 6 hours.

4. The process of claim 1 wherein said amount of organic solvent contacted with said polymeric latex is in the range of from about 60% to about 150% by weight of the polymeric latex.

5. The process of claim 4 wherein said organic solvent is a lower alkanol.

6. The process of claim 1 wherein said organic solvent is contacted with said polymeric latex by uniformly adding said solvent to said polymeric latex over a period of from about 0.5 to 2 hours.

7. The process of claim 1 wherein said amount of hydroxylamine salt corresponds to the stoichiometric amount required to react with the carbonyl groups of the polymeric particles of said latex.

8. The process of claim 1 wherein the amount of hydroxylamine salt is an amount of about 15% in excess of the stoichiometric amount required to react with the carbonyl groups of the polymeric particles.

9. The process of claim 8 wherein said hydroxylamine salt is hydroxylamine hydrochloride.

10. The process of claim 1 wherein said oximation reaction is conducted within a temperature range of about 25° C. to about 60° C. and over a period of from about 3 to 10 hours.

11. The process of claim 1 wherein said alkalinity is provided by an amount of alkali of up to about 20% in excess of that stoichiometrically required to provide free hydroxylamine from said hydroxylamine salt.

12. The process of claim 1 wherein the oximation product is neutralized with acid to recover the polymeric oxime.

13. The process of claim 1 wherein said emulsion polymerization is initiated with ammonium persulfate.

14. The process of claim 1 wherein the steps of introducing said portion of monomer into said polymerization medium and initiating said emulsion polymerization are conducted substantially simultaneously.

15. The process of claim 1 wherein said polymerization medium includes an emulsifying agent bis-tridecyl sodium sulfosuccinate.

16. The process of claim 1 wherein said polymerization medium includes a hydrocolloid stabilizer.

17. The process of claim 16 wherein said stabilizer is hydroxyethyl cellulose.

18. The process of claim 1 wherein said polymerizable monomer has the formula

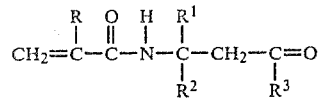

wherein R is hydrogen or methyl; each of $R^1$ and $R^2$ is alkyl of from 1 to 4 carbon atoms; and $R^3$ is hydrogen or alkyl of from 1 to 4 carbon atoms.

19. The process of claim 18 wherein R is hydrogen and each of $R^1$, $R^2$ and $R^3$ is methyl.

20. The process of claim 1 wherein said polymerizable monomer to be polymerized includes in an amount corresponding to about 1 to 10% by weight of the polymer of an ionizable monomer selected from the group consisting of acrylic acid, methyacrylic acid and 2-acrylamido-2-methylpropane sulfonic acid.

21. A process for preparing a polymeric oxime which comprises introducing into an aqueous polymerization medium about 1% to about 15% by weight of an amount of diacetone acrylamide to be polymerized; initiating the emulsion polymerization of said diacetone acrylamide, and while maintaining said polymerization, adding uniformly over a period of about 2 to 6 hours the remaining diacetone acrylamide to be polymerized; thereby to provide in an aqueous latex polymeric particles comprising recurring units from said diacetone acrylamide; contacting the polymeric latex with from about 60% to about 150% by weight of the latex of a lower alkanol to effect swelling of the polymeric particles; and oximating the swollen polymeric particles by reaction with hydroxylamine hydrochloride and alkali, said hydroxylamine hydrochloride being in at least stoichiometric amount required to react with the carbonyl groups of the polymeric particles and said alkali being at least the stoichiometric amount required to provide free hydroxylamine from said hydroxylamine hydrochloride.

22. The process of claim 21 wherein there is introduced into said polymerication medium about 1% to about 10% by weight of the polymer to be formed of acrylic acid.

23. The process of claim 22 wherein said polymerization medium includes hydroxycellulose stabilizer and wherein the lower alkanol is methanol.

* * * * *